(12) United States Patent
Good

(10) Patent No.: US 7,497,494 B1
(45) Date of Patent: Mar. 3, 2009

(54) SUSPENSION AIR BAG OPERATED DECK EXTENSION

(76) Inventor: Edward Z. Good, Route 2, Box 62, Memphis, MO (US) 63555

( * ) Notice: Subject to any disclaimer, the term of this patent is extended or adjusted under 35 U.S.C. 154(b) by 473 days.

(21) Appl. No.: 11/391,072

(22) Filed: Mar. 28, 2006

(51) Int. Cl.
*B60J 7/00* (2006.01)

(52) U.S. Cl. .............. 296/26.11; 414/537; 414/480; 14/71.3

(58) Field of Classification Search .......... 296/61, 296/26.08, 26.11; 414/537, 480; 14/71.3
See application file for complete search history.

(56) References Cited

U.S. PATENT DOCUMENTS

| | | | |
|---|---|---|---|
| 2,587,265 A | 2/1952 | Wright | 414/537 |
| 2,966,274 A | 12/1960 | Price | 414/556 |
| 3,142,394 A | 7/1964 | Schwartz | 414/537 |
| 4,020,957 A | 5/1977 | Wren | 414/537 |
| 4,114,944 A | 9/1978 | Joynt et al. | 296/50 |
| 4,305,694 A | 12/1981 | Chan | 414/482 |
| 4,372,727 A | 2/1983 | Fredrickson et al. | 414/537 |
| 4,498,836 A | 2/1985 | Love | 414/537 |
| 5,094,583 A | 3/1992 | Bills, Jr. et al. | 414/537 |
| 5,388,949 A | 2/1995 | Berg | 414/480 |
| 6,394,734 B1 | 5/2002 | Landoll et al. | 414/480 |
| 2006/0218731 A1* | 10/2006 | Muhl et al. | 14/71.3 |

* cited by examiner

*Primary Examiner*—Joseph D Pape
(74) *Attorney, Agent, or Firm*—Grace J. Fishel

(57) ABSTRACT

A deck extension for use on a truck or trailer deck mounted on a pair of I-beams. The deck extension has a platform pivoted to the truck deck and a pair of downwardly angled support beams attached to the I-beams and to a header. An air suspension bag is mounted on a shelf between the support beams for pivoting the platform about the hinge. A fence is pivoted on the header between a position where it is perpendicular to the platform and serves as a support and a position where it is generally parallel to the platform with the platform resting on a top surface of the support beams.

12 Claims, 4 Drawing Sheets

SUSPENSION AIR BAG OPERATED DECK EXTENSION

BACKGROUND OF THE INVENTION

1. Field of the Invention

The present invention relates to a deck extension for use on a flat bed truck or trailer to extend the length of the truck bed and to facilitate loading and unloading.

2. Brief Description of the Prior Art

The legal length of trailers on interstate highways has been increased from 48 feet to 53 feet. There is economic pressure on truck operators of the shorter trailers to take advantage of the change and the opportunity to carry a larger load.

A number of truck bed extensions have been proposed in the past. Many make use of hydraulic cylinders to move various support arms into position and are structurally complex, while others are hand operated. Representative truck bed extensions are described in U.S. Pat. Nos. 6,394,734, 4,498,836, 4,372,727, 4,305,694, 4,114,944, 3,142,394, 2,966,274 and 2,587,265.

What is needed is a truck bed extension that can be operated by a driver without assistance from another worker and that can be used as a loading ramp and upon which a load may be carried.

BRIEF SUMMARY OF THE INVENTION

In view of the above, it is an object of the present invention to provide a deck extension that can be used as a loading ramp and upon which a load may be carried. It is another object to provide a deck extension that can be operated by a driver without assistance from another worker. It is also an object to provide a deck extension that can be operated off the air pressure system of a truck tractor. Other objects and features of the invention will be in part apparent and in part pointed out hereinafter.

In accordance with the invention, a deck extension is provided for a truck or trailer deck supported by a pair of I-beams. The extension has a pair of downwardly and rearwardly extending support beams rigidly secured to the I-beams to which a transverse header is attached at a rear end of the support beams. A shelf is suspended between the support beams intermediate their ends.

A platform is hinged to the deck for pivoting movement between a position where the platform is level with the deck and a position where the platform is angled above or below the deck and a fence hinged to the transverse header for vertical swinging movement between a position where the fence and the platform are in generally parallel planes and a position where the fence is generally perpendicular to the platform.

At least one air suspension bag is mounted on the shelf between the support braces and connected to a source of pressurized air for pivoting the platform between the position where the platform is level with the deck and the position where the platform is angled above or below the deck. In the first position, the fence serves as a support for the platform and in the second position, the platform rests on the support beams.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 3:
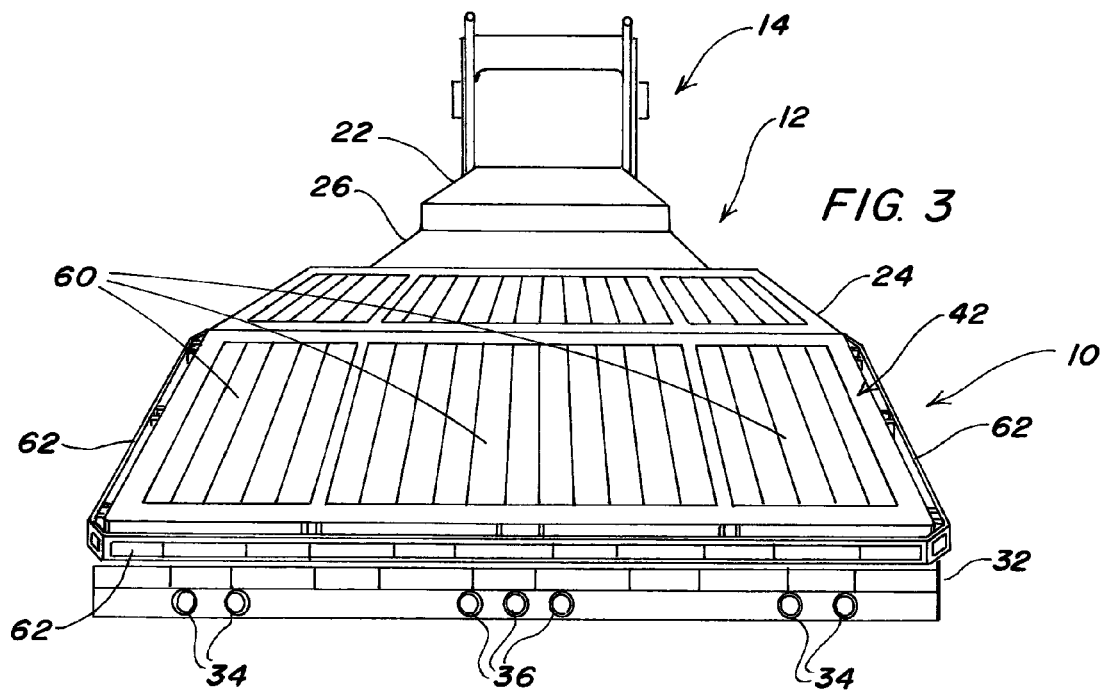
FIG. 3 is a perspective view of the deck extension from the rear shown mounted on a double drop trailer.

Referring to the drawings more particularly by reference character, reference numeral 10 refers to a deck extension for a flat bed trailer 12 such as used for transporting heavy equipment. It will be understood from the following description that trailer 12 is adapted for connection to a tractor 14 typically including a pressurized air supply. Trailer 12 is supported on conventional wheels 16. A deck 18 of trailer 12 is supported by a pair of laterally spaced, centrally disposed, structural I-beams 20 (FIG. 6) which run substantially the length of trailer 12. Trailer 12 may take a variety of forms with deck 18 all at one level, with a single drop, with a double drop, etc. As illustrated in FIG. 3, trailer 12 is a double drop trailer wherein deck 18 is raised at its front and rear ends 22, 24 with a lower portion 26 sandwiched between.

A pair of downwardly and rearwardly extending support beams 28 are rigidly secured to a rear end of I-beams 20 either directly or through an adapter 30 such as through plates welded to I-beams 20. The exact form of the connection to I-beams 20 depends on the structure of trailer 12. In cross-section support beams 28 may have the shape of an I, a box or some other structure capable of providing the required structural strength.

A transverse header 32 is rigidly secured to the rear of support beams 28. Header 32 extends laterally beyond support beams 28, across the back of trailer 12 and serves several functions, one of which is to be a bumper with an outer surface adapted to mount rear signal lamps 34 and reflectors 36 as shown. A shelf 38 is suspended between support beams 28 intermediate their ends. A pair of outwardly angled side braces 40 are also attached to support beams 28 intermediate their ends with a first end of side braces 40 attached to an outboard side of support beams 28 and a second end to header 32.

Figure 5:
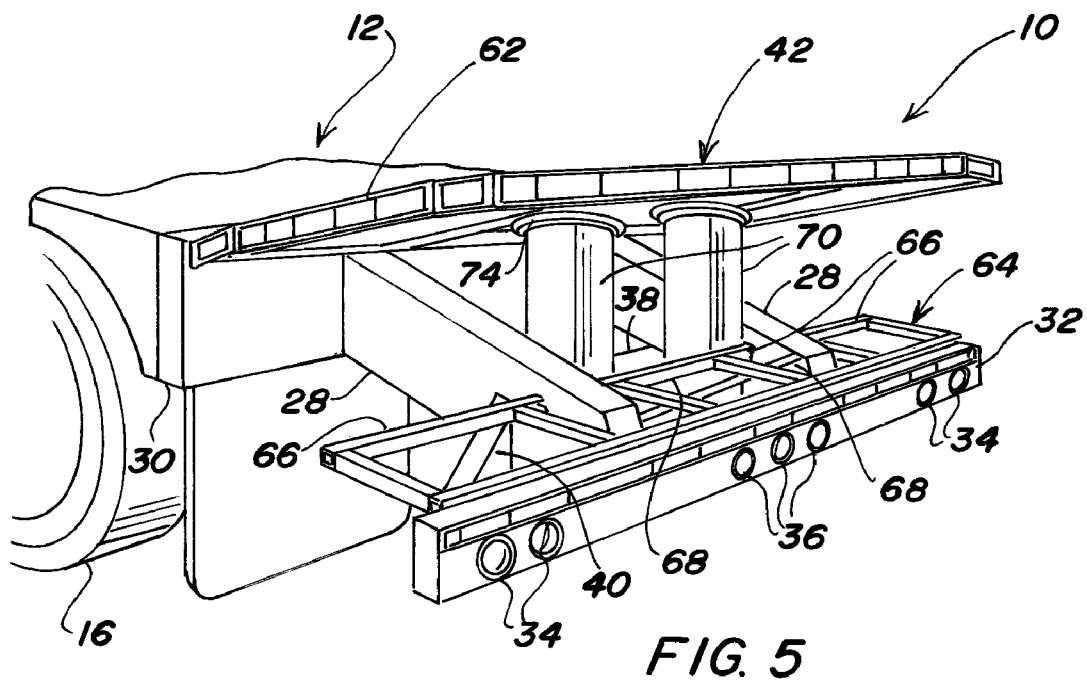
FIG. 5 is a perspective view of the deck extension shown in FIG. 4 with the fence pivoted down.
Figure 6:
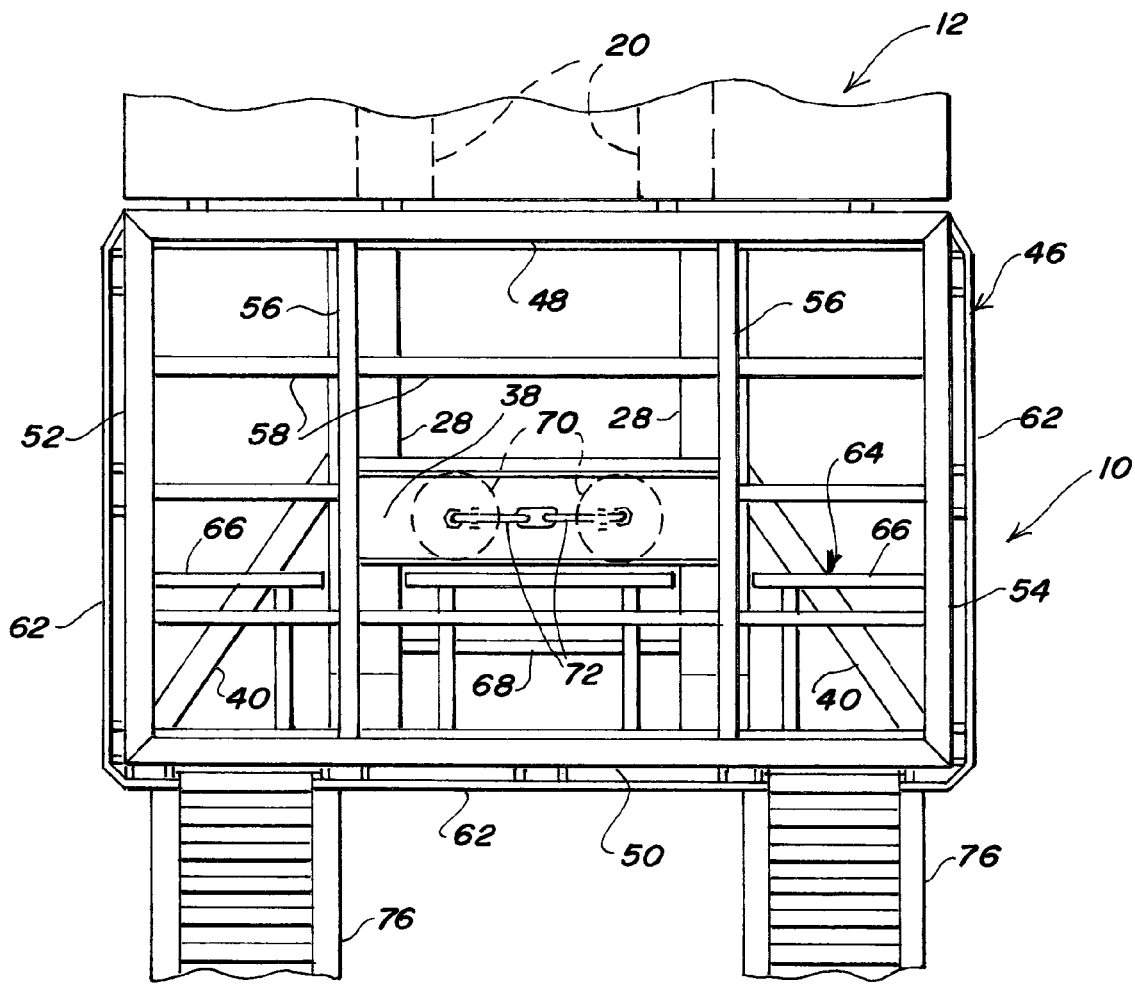
FIG. 6 is a plan view of the deck extension as shown in FIG. 2 with decking inserts removed from the platform to reveal a frame to which a pair of loading ramps are attached; and, FIG. 7 is a side elevational view of the deck extension as shown in FIG. 2 with the loading ramps attached.

A platform 42 is hinged 44 to trailer 12 for pivoting movement between a position where platform 42 is level with deck 18 (FIG. 1) and a position where platform 42 is angled above (FIGS. 4 and 5) or below deck 18 (FIGS. 2-3 and 6-7). As shown in FIG. 6, platform 42 is supported by a frame 46 with front and rear transverse extending members 48, 50, respectively, connected by laterally extending members 52, 54. A plurality of spaced apart, lateral braces 56 interconnect front and rear transverse members 48, 50. A top surface of lateral braces 56 is level with the top surface of front and rear transverse members 48, 50 and laterally extending members 52, 54. A plurality of spaced apart, transverse braces 58 interconnect lateral braces 56 and laterally extending members 52, 54 as shown. The top surface of transverse braces 58 is positioned below the top surface of transverse front and rear members 48, 50, laterally extending members 52, 54 and lateral braces 56 for receipt of decking inserts 60 (shown removed in FIG. 6), with the top surface of decking inserts 60 level with the top surface of transverse front and rear members 48, 50, laterally extending members 52, 54 and lateral braces 56 as shown in the other drawings. A rub guard or tie down channel 62 is provided on an outboard side of laterally extending members 52, 54 and rear transverse extending member 50. Reflectors 36 may be provided on rub guard or tie down channel 62.

Figure 1:
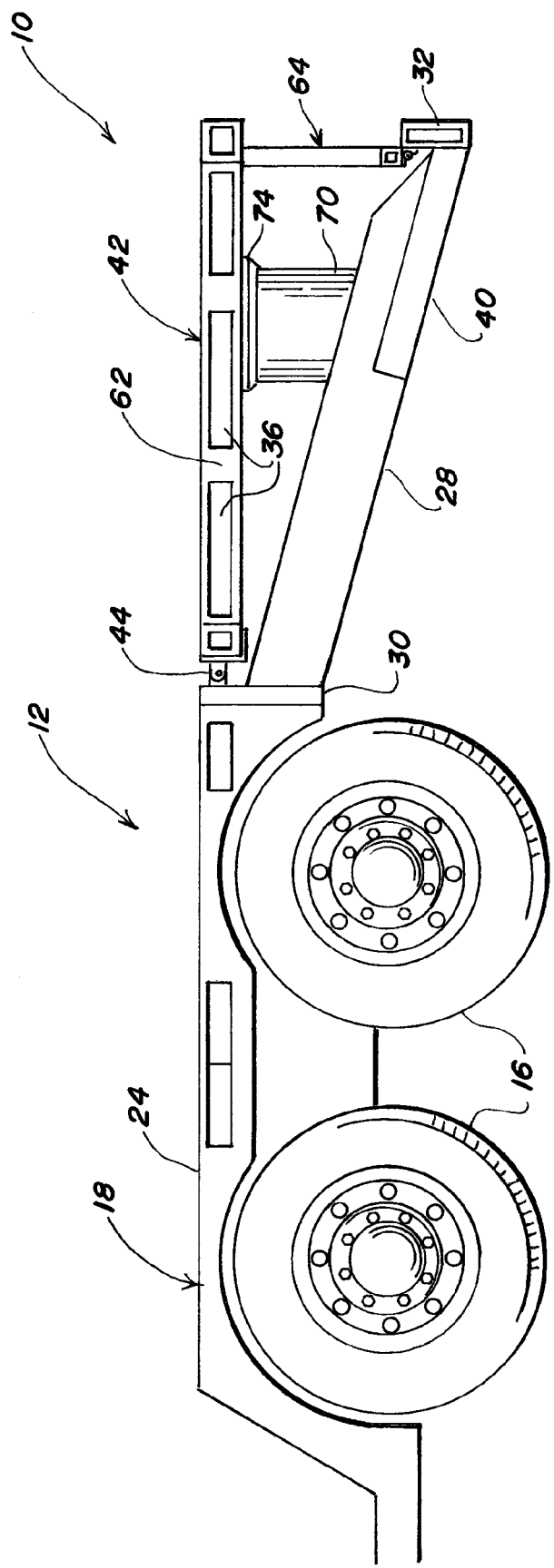
FIG. 1 is a side elevational view of a deck extension in accordance with the present invention with a platform hinged to a trailer shown level with a bed of the trailer.
Figure 4:
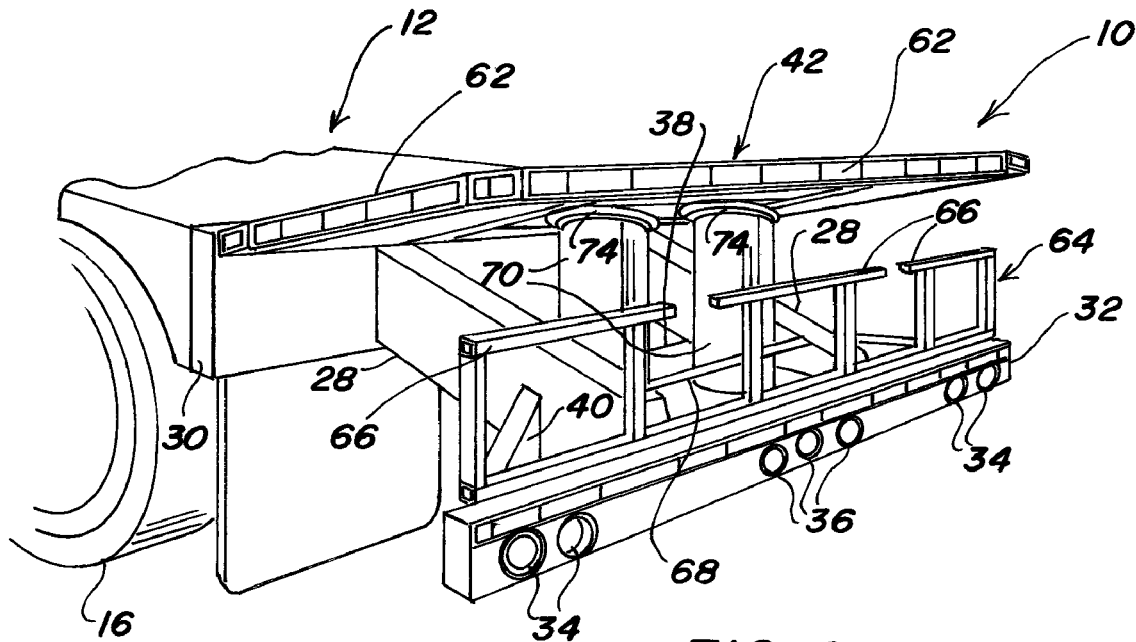
FIG. 4 is a perspective view of the deck extension shown with the platform lifted upwardly by a pair of air bags such that a fence can be pivoted.

A fence 64 is hinged to header 32 for vertical swinging movement between a position where fence 64 and support beams 28 are in generally parallel planes (FIGS. 2 and 7) and a position where fence 64 is generally perpendicular to platform 42 (FIG. 1). Fence 64 may be furcated in sections 66 as shown in FIGS. 4-5 so that sections 66 pass between the ends of support beams 28 with sections 66 coming to rest on a top surface of outwardly angled side braces 40 (FIGS. 2 and 5) which may be set below a top surface of support beams 28 and a cross brace 68 between support beams 28 rearward of shelf 38 (FIG. 5).

One or more air suspension bags 70 are mounted on shelf 38. Air suspension bags 70 are of the kind used in air suspension systems in the trucking industry. Air suspension bags 70 mounted on shelf 38 are connected by hoses 72 to a source of pressurized air supplied by tractor 14 or, optionally, by a separate pressurized air supply. As illustrated, air suspension bags 70 are cylindrical, the base of which is mounted on shelf 38. A cap 74 at the top of air suspension bags 70 may be provided for attachment to transverse braces 58 and lateral braces 56 of frame 46.

Figure 7:
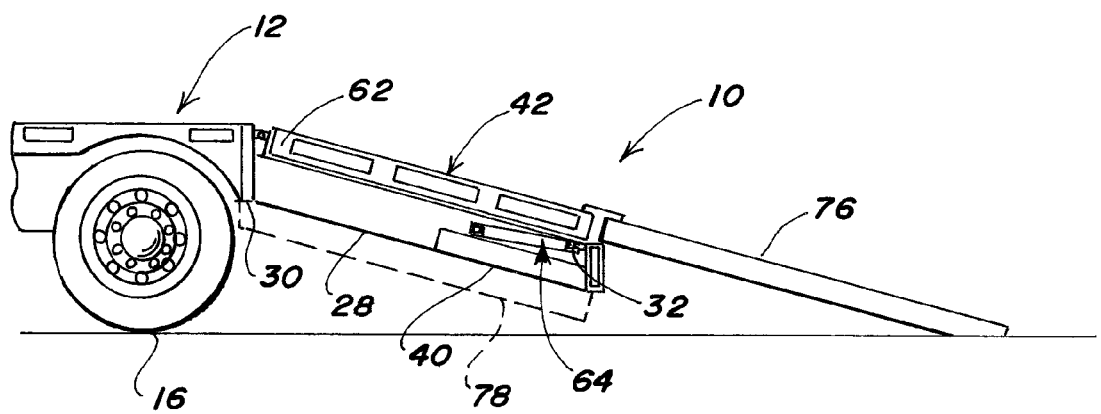

A pair of tracks 76 may be supplied for hooked attachment into rub guard and tie down channel 62 at the rear of platform 42 as seen in FIGS. 6 and 7. Tracks 76 may be angled independent of the angle of platform 42 on support beams 28.

In use, deck extension 10 is attached to trailer 12 as described above. Deck extension 10 is particularly useful in adding length to a 48 foot trailer such that it is extended to the maximum legal length for highway use.

Figure 2:
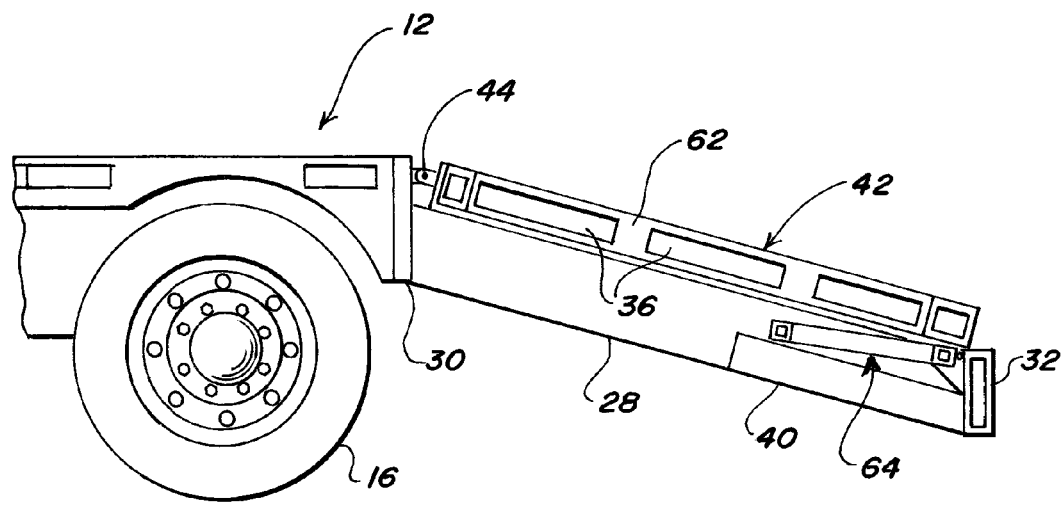
FIG. 2 is a side elevational view the deck extension shown with the platform angled downwardly.

After deck extension 10 is attached to trailer 12, a source of pressured air, typically from tractor 14, is attached to air suspension bags 70 through hoses 72. When it is desired to load trailer 12, starting from the position shown in FIG. 1, air suspension bags 70 may be pressurized to lift platform 42 as shown in FIG. 4 such that fence 64 may be pivoted down as shown in FIG. 5. The pressure on air suspension bags 70 is then relieved, causing platform 42 to pivot downwardly until it comes to rest on the top surface of support beams 28 as shown in FIG. 2.

If needed, tracks 76 may be hooked into rub guard and tie down channel 62 as shown in FIGS. 6-7. The rear end of trailer 12 may also be lowered as shown in broken lines 78 in FIG. 7 by dumping the air in the air suspension bags (not shown) at rear wheels 16 if trailer 12 has air suspension.

After equipment has been loaded on deck 18 of trailer 12 and/or upon deck extension 10, tracks 76 are removed, if used, and air suspension bags 70 inflated to raise platform 42 above the level of deck 18 such that fence 64 may be pivoted back into vertical position as shown in FIG. 4. Pressure on air suspension bags 70 is then relieved such that the rear end of platform 42 comes to rest on an upper end of fence 64 as shown in FIG. 1. As will be apparent, fence 64 provides a rigid support for platform 42 and the pressure on air suspension bags 70 may be further relieved. Alternately, with suitable pressure regulators, air suspension bag 70 may be used to provide continued support to platform 42 with fence 64 providing backup support.

In view of the above, it will be apparent that the entire operation of deck extension 10 may be performed by just one worker and, other than for pivoting fence 64 up and down and attaching tracks 76, from the cab of tractor 14.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. A deck extension for a truck or trailer deck supported by a pair of I-beams comprising
   a pair of downwardly and rearwardly extending support beams which are rigidly secured to the I-beams, a transverse header attached to a rear end of the support beams, a shelf suspended between the support beams intermediate their ends,
   a platform hinged to the deck for pivoting movement between a position where the platform is level with the deck and a position where the platform is angled above or below the deck,
   a fence hinged to the transverse header for vertical swinging movement between a position where the fence and the platform are in generally parallel planes and a position where the fence is generally perpendicular to the platform, and,
   at least one air suspension bag mounted on the shelf suspended between the support beams and connected to a source of pressurized air for pivoting the platform between the position where the platform is level with the deck and the position where the platform is angled above or below the deck.

2. The deck extension of claim 1 wherein the platform comprises a frame with deck inserts.

3. The deck extension of claim 1 wherein the fence is formed in sections so that the sections pass between the ends of the support beams.

4. A deck extension for a truck or trailer deck supported by a pair of I-beams comprising
   a pair of downwardly and rearwardly extending support beams which are rigidly secured to the I-beams, a transverse header attached to a rear end of the support beams, a shelf suspended between the support beams intermediate their ends,
   a platform hinged to the deck for pivoting movement between a position where the platform is level with the deck and a position where the platform is angled above or below the deck, said platform having a rub guard and tie down channel,
   a fence hinged to the transverse header for vertical swinging movement between a position where the fence and the platform are in generally parallel planes and a position where the fence is generally perpendicular to the platform, and at least one air suspension bag mounted on the shelf suspended between the support beams and connected to a source of pressurized air for pivoting the platform between the position where the platform is level with the deck and the position where the platform is angled above or below the deck.

5. The deck extension of claim 4 further including a pair of tracks that hook into the rub guard and tie down channel of the platform.

6. The deck extension of claim 4 wherein the platform comprises a frame with deck inserts.

7. The deck extension of claim 4 wherein the fence is formed in sections so that the sections pass between the ends of the support beams.

8. The deck extension of claim 4 wherein the support beams are I-shaped in cross-section.

9. The deck extension of claim 4 wherein the support beams are box-shaped in cross section.

10. A deck extension for a truck or trailer deck supported by a pair of I-beams comprising a pair of downwardly and rearwardly extending support beams which are rigidly secured to the I-beams, a transverse header attached to a rear end of the support beams, a shelf suspended between the support beams intermediate their ends, a pair of outwardly angled side braces attached to the support beams and to the header, a cross brace between the support beams between the shelf and the header, a platform hinged to the deck for pivoting movement between a position where the platform is level with the deck and a position where the platform is angled above or below the deck, said platform comprising a frame with deck inserts, a fence hinged to the transverse header for vertical swinging movement between a position where the fence and the platform are in generally parallel planes and a position where the fence is generally perpendicular to the platform, and at least one air suspension bag mounted on the shelf suspended between the support beams and connected to a source of pressurized air for pivoting the platform between the position where the platform is level with the deck and the position where the platform is angled above or below the deck.

11. The deck extension of claim 10 wherein the fence is formed in sections that pass between the support beams and when pivoted generally parallel to the platform rest upon the side braces and the cross brace.

12. The deck extension of claim 10 wherein the frame comprises front and rear transverse extending member connected by laterally extending members, a plurality of lateral braces interconnecting the front and rear transverse members with a top surface of the front and rear transverse extending members, laterally extending members and lateral braces in a first plane, a plurality of transverse members interconnecting the lateral braces and the laterally extending members with a top surface in a second plane spaced below the first plane for receipt of the deck inserts such that a top surface of the deck inserts are in the first plane.

* * * * *